United States Patent [19]

Masuda et al.

[11] Patent Number: 5,052,985
[45] Date of Patent: Oct. 1, 1991

[54] CHAIN-TYPE POWER TRANSMISSION BELT

[75] Inventors: Takashi Masuda, Kobe; Hiroshi Takano, Miki; Takashi Hoshiro, Takarazuka, all of Japan

[73] Assignee: Mitsubishi Belting Ltd., Nagata, Japan

[21] Appl. No.: 543,469

[22] Filed: Jun. 26, 1990

Related U.S. Application Data

[63] Continuation-in-part of Ser. No. 370,000, Jun. 28, 1988, Pat. No. 4,944,715.

[30] Foreign Application Priority Data

Jun. 30, 1989 [JP] Japan .................................. 63-170872
Nov. 13, 1989 [JP] Japan ........................... 63-132448[U]

[51] Int. Cl.⁵ ............................................... F16G 1/21
[52] U.S. Cl. .................................................... 474/245
[58] Field of Search ............... 474/237, 240, 242, 244, 474/245, 201

[56] References Cited

U.S. PATENT DOCUMENTS

| 4,618,338 | 10/1986 | Rattunde et al. | 474/245 |
| 4,798,567 | 1/1989 | Hoshiro et al. | 474/245 X |
| 4,898,568 | 2/1990 | Sakakibara et al. | 474/245 |

Primary Examiner—Thuy M. Bui
Attorney, Agent, or Firm—Wood, Phillips, Mason, Recktenwald & Vanasanten

[57] ABSTRACT

A chain-type force transmission belt for engagement with a pulley, which transmission belt consists of a plurality of link plates, a plurality of pins connecting the link plates so as to define an endless flexible belt with at least one of the pins having a lengthwise axis and axially spaced first and second ends, a first tip member/block for placement in an operative position at the first pin end and having a first surface for engagement with a pulley, a second tip member/block for placement in an operative position at the second pin end and having a second surface for engagement with a pulley, and structure separate from the one pin for connecting the first and second tip members/blocks together for holding the first and second tip members/blocks in their operative relationship.

35 Claims, 8 Drawing Sheets

Fig. 20

CHAIN-TYPE POWER TRANSMISSION BELT

CROSS-REFERENCE

This application is a continuation-in-part application Ser. No. 370,000 filed June 28, 1988, entitled "Chain for V-Belt".

BACKGROUND OF THE INVENTION

1. Field of the Invention

This invention relates to chain-type power transmission belts and, more particularly, to a chain-type power transmission belt that is particularly adaptable to vehicle transmission systems, such as those on automobiles.

2. Background Art

Flexible endless chain belts made up of pivotably joined and meshed primary and secondary link plates are known in the art. Typically, laterally extending pins connect the link plates and also serve as mounting elements for movable tip members/blocks which engage the surface defining the pulley grooves which receive the belt. These tip members/blocks are spaced at regular intervals longitudinally of the belt and are successively brought into engagement with a pulley as the belt is advanced in operation.

To effect positive drive with the above-type belts, it is important that the tip members/blocks establish a substantial contact area with the pulley. To accomplish this, the tip members/blocks are each provided with an inclined surface for engagement with the pulleys. The inclined surfaces are angularly oriented to be generally parallel to the surfaces of the walls defining the pulley groove which they engage. To maximize the contact area between the tip members/blocks and pulley, the tip members/blocks are commonly attached to the pins so as to be movable relative thereto in substantially a universal-type pivoting motion.

One example of such a structure is shown in U.S. Pat. No. 4,798,567, to Hoshiro et al. In Hoshiro et al, a ball and socket-type connection is established between opposite ends of each pin and tip members/blocks attached thereto. As the tip members/blocks initially engage the pulley, the tip members/blocks tend to be reoriented to facially engage the laterally outer tip member/block surfaces with the confronting pulley surface. The facial engagement between the tip member/block surfaces and pulley is desirable not only from the standpoint of its increasing drive force, but also in that it suppresses vibration of the belt, minimizes twisting of the belt, and avoids detrimental impacts between the tip members/blocks and pulley that generate noise and/or progressively cause damage to the tip members/blocks and/or pulley. Instead, the pulley surface contacting the tip members/blocks exerts a torque on the tip members/blocks to effect rotation/pivoting of the tip member until the tip member/block surfaces and pulley surface assume a parallel, facially engaging relationship.

Heretofore, the cooperating pin ends and tip members/blocks have had to be manufactured to very close tolerances. Generally, conventional ball and socket connections result in a tight fit between the pin ends and tip members/blocks. In the absence of a close fit between the tip members/blocks and pin ends, the tip members/blocks have a tendency to fall off in use. The result of this is that the belt will run unevenly and vibrate and excessive wear will inevitably result on the system.

A further problem with a close connection between a tip member/block and pin end is that there results a considerable resistance to repositioning of the tip member/block. As a consequence, a substantial friction force is developed between the tip members/blocks and pins and may result in wear on both the tip members/blocks and pins that may precipitate premature belt failure.

Also, when the tip member/block closely embraces the pin end, there is a tendency for noise to be generated as relative movement occurs therebetween. There is also a problem with noise generation between the belt and pulley when the tip members/blocks do not rapidly reposition to properly align with the pulley. If the tip members/blocks are tightly held on the pins, the tip members/blocks may impact the pulley in a skewed position.

A further problem with prior art belts is that each tip member/block is normally unrestrained in its range of rotation relative to its associated pin. This may result in an improper orientation of certain of the tip members/blocks which creates gaps in the belt, which may result in vibration, noise generation, uneven wear on the belt, and ultimately disengagement of the tip members/blocks from their associated pin. Freely rotatable pins may also rotate excessively, develop friction and cause wear between both the tip members/blocks and pin and tip members/blocks and pulley in use.

Another problem with prior art systems is that they generally do not adapt readily to variable speed pulley configurations. In such variable speed pulleys, cooperating pulley parts are movable axially towards and away from each other to vary the effective width of the pulley groove and therefore the effective/pitch diameter of the pulley. As the pulley groove width is varied, the point of contact between the tip members/blocks varies in a radial direction which, with conventional systems, would cause misalignment of the tip member/block surfaces and pulley surface. This results in most conventional systems in a reduced contact area between the tip members/blocks and pulleys, which could cause ineffective drive transmission, and excessive and uneven wear between the tip member/block surfaces and pulleys.

Certain prior art systems have tip members/blocks that rotate with the mounting pin therefor. In these systems, if the belt and/or pulley are misaligned, the belt may twist so as to cause a torsional stress between the pin ends. Pin fracture frequently results.

SUMMARY OF THE INVENTION

The present invention comprehends a chain-type force transmission belt for engagement with a pulley, which transmission belt consists of a plurality of link plates, a plurality of pins connecting the link plates so as to define an endless flexible belt with at least one of the pins having a lengthwise axis and axially spaced first and second ends, a first tip member/block for placement in an operative position at the first pin end and having a first surface for engagement with a pulley, a second tip member/block for placement in operative position at the second pin end and having a second surface for engagement with a pulley, and structure in addition to the one pin for connecting the first and second tip members/blocks together to thereby hold the first and second tip members/blocks in their operative positions.

In a preferred form, the tip members/blocks are connected so as to be rotatable independently of one another about the one pin axis and also universally pivotable about the pin ends.

With the above construction, the pulley engaging surface on the tip members/blocks is consistently facially presented to the cooperating pulley surface. This maximizes the force transmission capability for the belt, minimizes vibration and noise generation, and reduces system wear over most prior art belt systems. At the same time, torsional forces on the pin are minimized.

At the same time, the tip members/blocks are positively held in their operative position. In a preferred form, the connecting structure for the tip members/blocks has a U-shaped configuration with a tie bar and connectors/legs. The connectors/legs have facing edges which captively hold the tip members/blocks in their operative positions. As long as the connecting structure is attached to the tip members/blocks, the tip members/blocks cannot separate from the pins.

Positive holding of the tip members/blocks in their operative positions, through the above structure, also permits a loose fit between the pin and tip members/blocks. This loose connection has several advantages. First of all, it permits looser manufacturing tolerances between the tip members/blocks and pins. As a result, the parts are less expensive to construct than those made to close tolerances, which reduces the overall manufacturing costs for the belt. At the same time, the loosely fitting tip members/blocks rapidly reposition to assume a preferred orientation with respect to a cooperating pulley.

Several other features are incorporated into the inventive belt to facilitate uninhibited movement between the tip members/blocks and pulley, to thereby minimize friction and heat generation resulting therefrom, reduce wear and cause a consistent desired orientation of the tip members/blocks with respect to a pulley.

In one form of the invention, the tip members/blocks each have a cup-shaped seat to accept the pin end. The base of the seat preferably has a concave surface which cooperates with a curved nose on the end of the pin. The curved seat preferably has a larger radius than does the pin end so that the contact area between the pin end and the seat is reduced, without compromising the guided pivoting of the tip member/block relative to the pin.

To further facilitate free rotation between the tip members/blocks and pins, structure is provided to introduce lubricant within the seat. This reduces friction between the pin and tip members/blocks during operation.

Another structure that facilitates free rotation of the tip members/blocks on the pins is a curved seat which may optionally be provided on the outermost link plate to accept a curved seat on the tip members/blocks. These surfaces may be in contact or slightly spaced from each other. Preferably, there is a space between the surfaces that increases progressively radially away from the pin axis.

Another aspect of the invention is the provision of facing, planar surfaces on the outermost link plate and each adjacent tip member/block, which surfaces are parallel to each other, preferably spaced from each other, and non-perpendicular to the axis of the pin. This arrangement allows for free rotation between the tip members/blocks and pins within only a limited range. Because the tip members/blocks rotate about the pin axis, upon a predetermined amount of rotation of each tip member/block occurring, the facing surfaces on the tip member/block and link part wedge against each other to arrest rotation.

The invention contemplates several variations of connecting structure for the tip members/blocks. The connecting structure can be a stamped metal element with an elongate tie bar and offset connectors, each of which has an entirely enclosed opening through which part of the tip member/block extends, or resilient legs which are pressed into engagement so as to captively surround the tip member/block. Alternatively, the entire connecting structure can be formed from a single piece of wire. The connectors define a curved seat, the axis of which can either be aligned with the axis of the pin or offset therefrom, as when the tip member/block surface is inclined to match the angle of the pulley surface.

The invention also contemplates a single connecting structure to engage a plurality of pins. The tie bar and connectors/legs can be made wider and more rigid than a corresponding tie bar on connecting structures associated with a single pin.

DETAILED DESCRIPTION OF THE DRAWINGS

In FIGS. 1-5, an exemplary force transmission belt 10, according to the present invention, is shown, to include four primary link plates 12 connected by pins 14 with three secondary link plates 16 in alternating relationship across the width of the belt 10. The meshed link plates 12, 16 are relatively positioned to define a flexible, endless belt. Each of the pins 14 extends through aligned bores in the link plates 12, 16 and has a cylindrical body 17 with axially opposite, rounded ends 18 projecting laterally through the link plates 12, with each exposed end 18 thereof operatively engaging a tip member/block 20. The tip members/blocks 20 at the opposite pin ends 18 are identical in construction, with each having a surface 22 to be placed in contact with a surface 24 bounding the groove of a V pulley 26 to effect driving of the pulley 26 as the belt 10 is advanced. The rounded pin ends 18 each reside in a cup-shaped socket 28 in the tip members/blocks 20 so that each of the tip members/blocks 20 is rotatable within a limited range relative to the pin ends 18 about the lengthwise pin axis 30 and is also universally pivotable relative to the pin ends 18.

Each tip member/block 20 has a laterally inwardly facing and outwardly opening convex surface 32 confronting a curved, outwardly opening seat 34 on the outermost link plate 12. The radius of curvature for the convex surface 32 of each tip member/block 20 is smaller than that for the curved seat 34 on the cooperating outermost link plate 12, with the clearance between each tip member surface 32 and seat 34 increasing progressively radially outwardly from the pin axis 30. The surfaces 22 of the tip members/blocks 20 are at least partially flat and normally situated at other than a right angle to the pin axis 30 to align parallel to and facially contact the pulley surface 24. The universal pivoting resulting from the ball and socket-type connection between the pin ends 18 and tip members/blocks 20 maintains this facial engagement, as described in further detail below.

Figure 2:
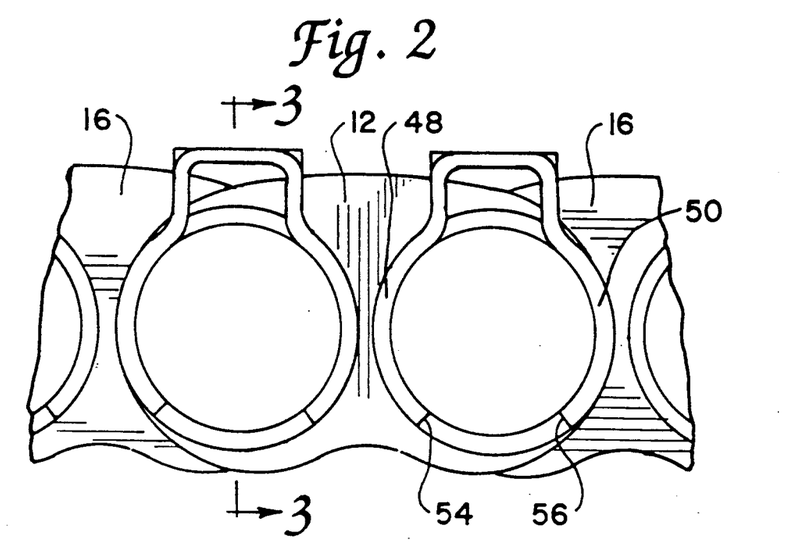
FIG. 2 is a enlarged, side elevation view of the belt of FIG. 1.
Figure 3:
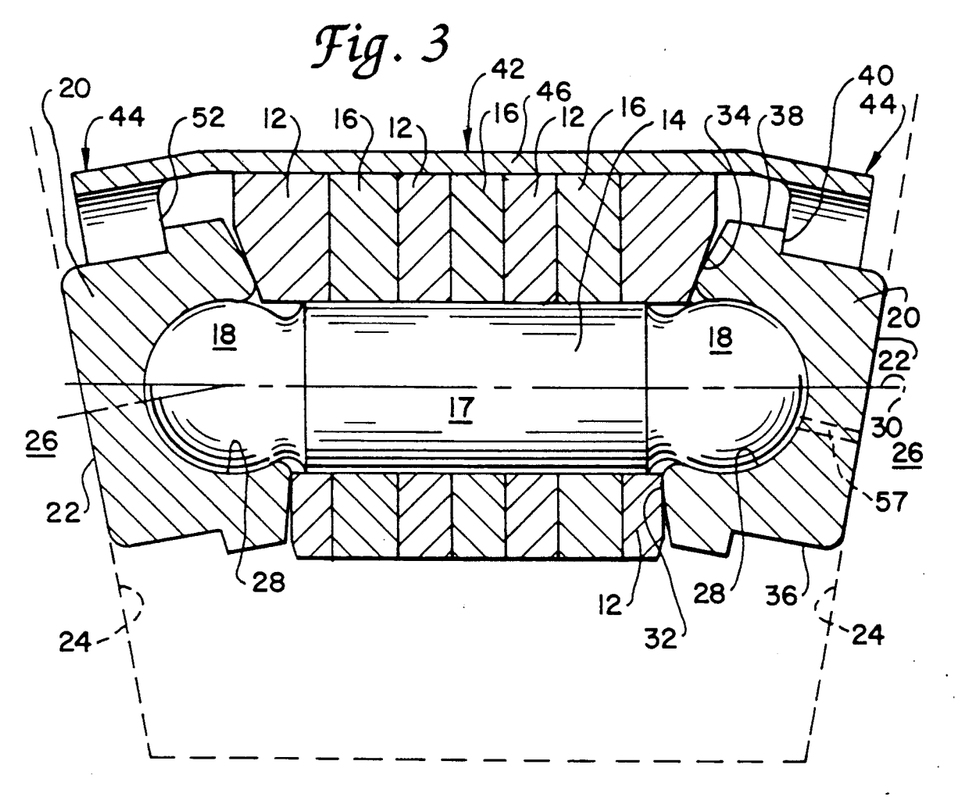
FIG. 3 is a cross-sectional view of the belt taken along line 3—3 of FIG. 2.
Figure 4:
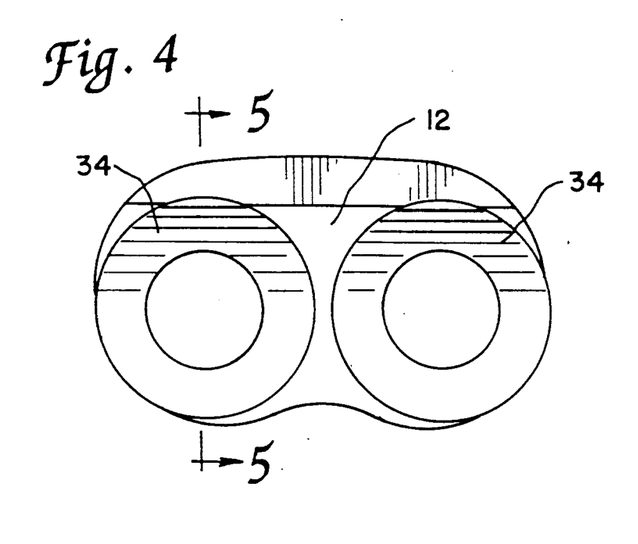
FIG. 4 is a side elevation view of a link plate on the belt in FIG. 1 to which each tip member/block is abutted.
Figure 5:
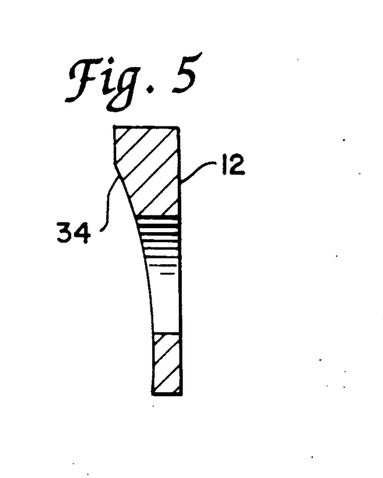
FIG. 5 is a cross-sectional view of the link plate taken along line 5—5 of FIG. 4.
Figure 7:
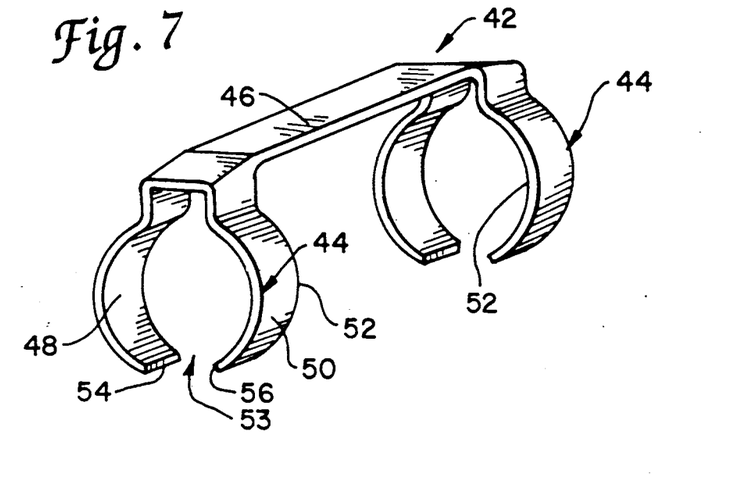
FIG. 7 is a perspective view of a connecting structure for tip members/blocks according to the present invention.

Each of the tip members/blocks 20 has a stepped configuration with a reduced diameter, cylindrical head 36 and an enlarged rim 38 spaced laterally inwardly from the head 36 and defining a laterally facing annular shoulder 40. As seen in FIGS. 2, 3 and 7, a connecting means 42 for the tip members/blocks 20 is provided in the form of a U-shaped, leaf-type spring with spaced end connectors 44 fixedly interconnected by a flat tie bar 46. Each end connector 44 is defined by a spaced, curved legs 48, 50 which captively embrace the tip member/block head 36 through greater than 180°. Each connector 44 has a laterally inwardly facing edge 52 to abut the shoulder 40 on a tip member/block 20. With the leaf spring connecting means 42 operatively attached, the tip members/blocks 20 are captively held between the spaced facing edges 52 on the leaf spring connecting means 42 so as to prevent the tip members/blocks 20 from disengaging from their associated pin ends 18. A space 53 is left between the free ends 54, 56 of the legs 48, 50 to provide an entry opening for the head 36 on a tip member/block 20 during assembly. This allows the leaf spring connecting means 42 to be press fit into its operative position by forcing the legs 48, 50 against the head 36 sufficiently that the legs 48, 50 are wedged apart to permit passage of the head 36 through the opening 53 between the legs 48, 50. Also, by leaving clearance between the legs 48, 50 on the connectors 44 and the tip members/blocks 30, the legs 48, 50 are permitted to flex so that the leaf spring connecting means 42 does not significantly inhibit rotation or pivoting of the tip members/blocks 20.

By providing a lubrication bore 57 (FIG. 3) in each tip member/block 20 communicating from the external surface 22 of each tip member/block 20 to the end 18 of the associated pin 14, lubricant can be introduced to facilitate free relative movement between the pin ends 18 and surfaces of the sockets 28 in the tip members/blocks 20.

The above-described embodiment does not require intimate contact between the pin ends 18 and surface of each socket 28. In other words, a loose connection is permitted. With such a loose connection, the leaf spring connecting means 42 positively prevents the tip members/blocks 20 from separating from the pin 14. This allows looser tolerance in the manufacturing of the pin ends 18 and tip members/blocks 20, thereby facilitating inexpensive belt manufacture.

Belts as shown in FIGS. 1-5 and 7 can be readily assembled. Each of the pin ends 18 is initially press fit into its respective socket 28 after which the leaf spring connecting means 42 is simply snap fit into place to complete the assembly.

Figure 6:
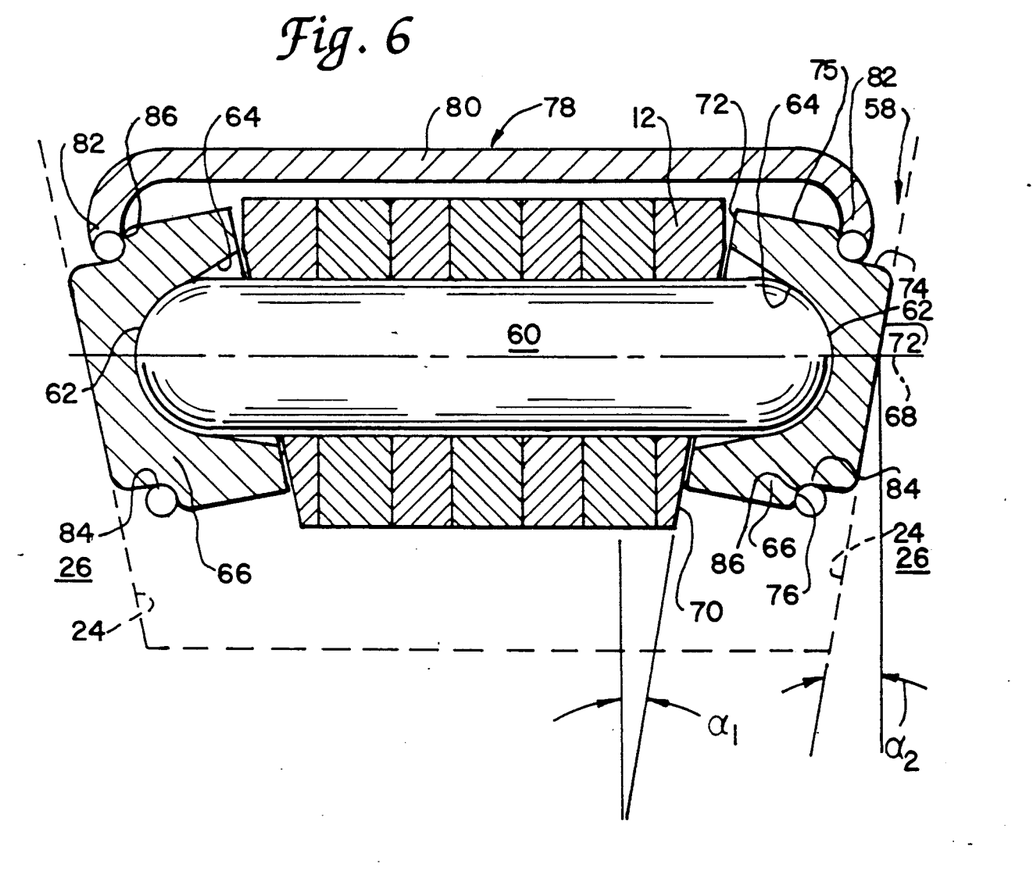
FIG. 6 is a cross-sectional view of a modified form of a chain-type force transmission belt according of the present invention.
Figures 8, 9:
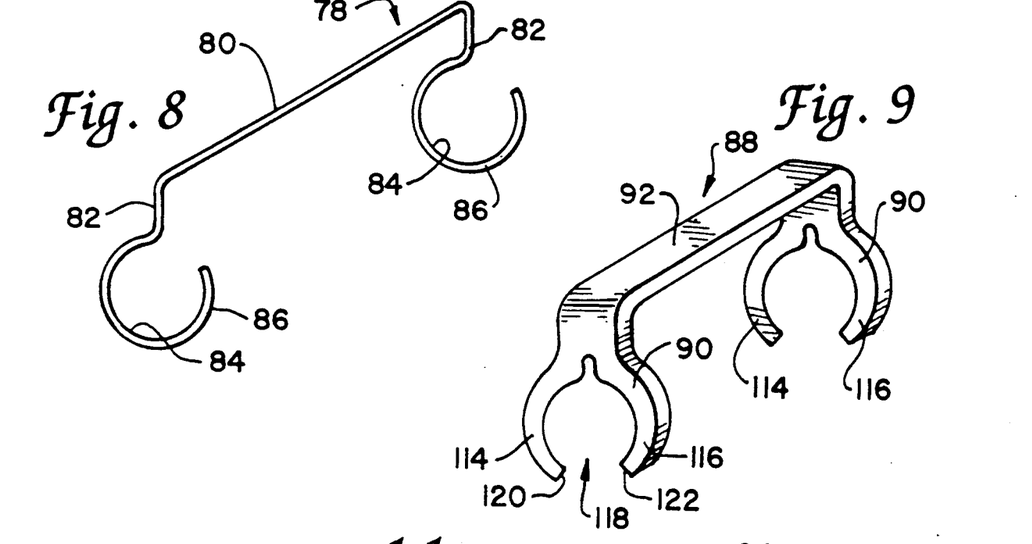
FIG. 8 is a perspective view of a modified form of tip member/block connecting structure according to the present invention.
FIG. 9 is a perspective view of a still further modified form of tip member/block connecting structure according to the present invention.

FIGS. 6 and 8 show a modified chain-type force transmission belt 58 according to the present invention. A pin 60 has a cylindrical configuration with rounded ends 62 for reception in curved, U-/cup-shaped seats 64 in tip members/blocks 66 to permit smooth rotation/pivoting of the tip members/blocks 66 relative to the pin 60. The tip members/blocks 66 are arranged so that the centers of the U-shaped seats 64 are offset from the pin axis 68. A slight clearance is provided between each tip member/block 66 and an outer, inclined surface 70 on the outermost link plate 12. The surface 70 is spaced from and parallel to a confronting planar surface 72 on the tip member/block 66.

The inclined surface 70 of each outermost link plate 12 has an inclination angle $\alpha 1$ approximately equal to the angle $\alpha 2$ of the surface 24 bounding the groove defined by the pulley 26. The outer surface 72 of the tip member/block 66 is planar and oriented to facially abut the pulley surface 24, as in the prior embodiment.

Each tip member/block 66 has a stepped configuration with a reduced diameter cylindrical head 74 and a radially enlarged rim 75 defining an annular shoulder 76. A formed wire connecting means 78, as shown in FIGS. 6 and 8, holds the tip members/blocks 66 in operative position on the pin 60. The connecting means 78 has an elongate body/tie bar 80 spanning the belt width with integral connectors/legs 82 bent out of the line of the tie bar 80 and each formed to define a curved receptacle 84 for the heads 74 of the tip members/- blocks 66. The oppositely facing shoulders 76 on the tip members/blocks 66 are captively held between the facing edges 86 on the legs 82.

Figure 1:
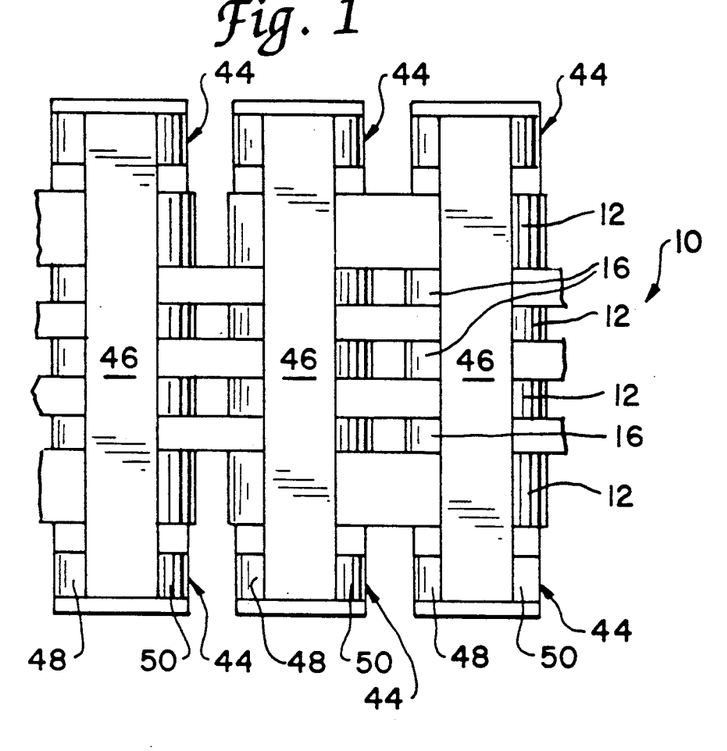
FIG. 1 is a plan view of a portion of a chain-type force transmission belt with movable tip members/blocks and connecting structure therefor according to the present invention.
Figure 10:
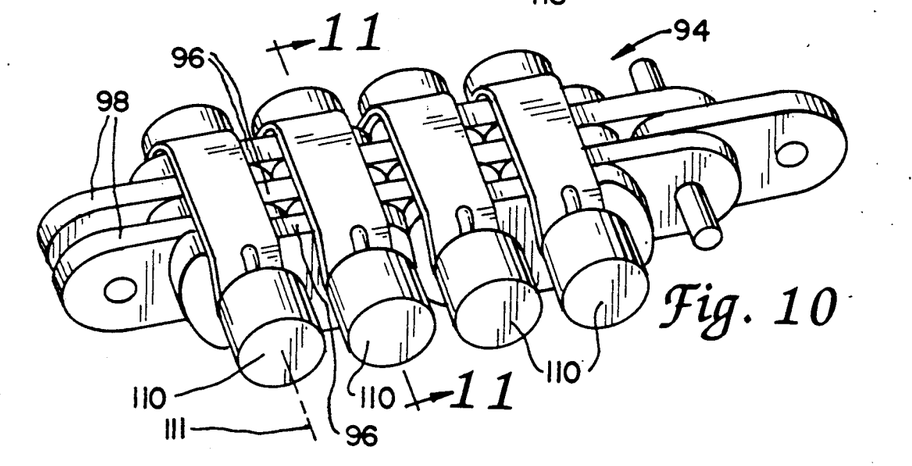
FIG. 10 is a perspective view of a modified form of chain-type transmission belt according to the present invention.
Figure 11:
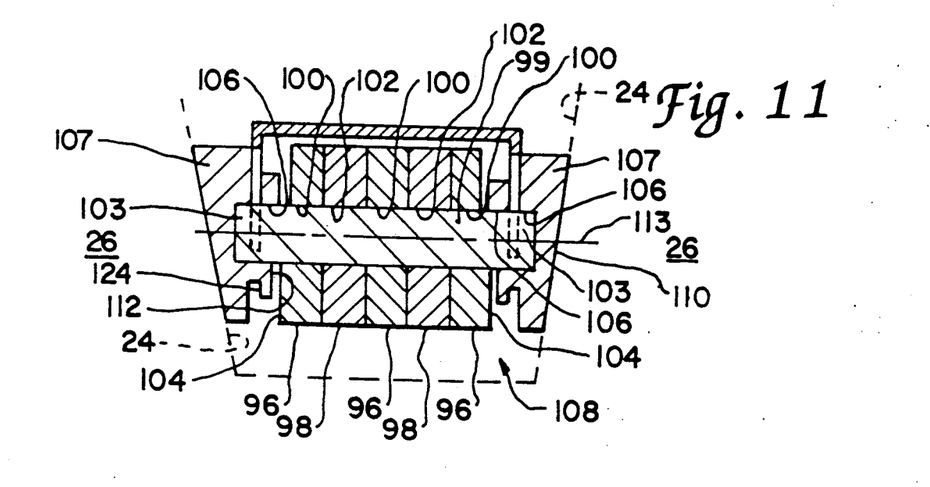
FIG. 11 is a cross-sectional view of the belt taken along line 11—11 of FIG. 10.

The connecting means 42, 78, used in either one of the above-mentioned belt embodiments, may take any of a variety of shapes, such as, but not limited to, those illustrates in FIGS. 7-9. Each of the connecting means 42, 78, 88 (FIG. 9) is generally U-shaped and has spaced connectors 44, 82, 90, respectively, joined by a tie bar 46, 80, 92, respectively. The connecting means 42 in FIG. 7 is designed for but not limited to use with a chain belt as shown in FIGS. 1-3, while the connecting means 78 shown in FIG. 8 is designed for but not limited to use with a chain belt as shown in FIG. 6. The connecting means 88 shown in FIG. 9 is designed for use with a chain belt 94 as shown in FIGS. 10 and 11, as described below.

In the chain-type transmission belt 94, a plurality of primary link plates 96 are placed in parallel alignment at regular intervals with secondary link plates 98, each of which has the same general shape and is meshed with the primary link plates 96. Pins 99 extend through bores 100, 102 respectively in the primary link plates 96 and secondary link plates 98 to hold the link plates 96, 98 together in an endless flexible chain.

The opposite ends 103 of each pin 99 protrude laterally from the external surfaces 104 of the outermost link plates 96 and extend into cup-shaped seats 106 in the tip members/blocks 107, which engage the surface 24 of the pulley 26 defining the pulley groove 108. Each of the tip members/blocks 107 takes a generally cylindrical form, with the laterally outwardly facing, flat surface 110 thereon angled to be complementary to the surface 24 bounding the pulley groove 108, so that facial engagement between the surfaces 24, 110 is effected in operation. The axes 111 of the tip member/block 107 and seats 106 coincide with the axis 113 of the pin 99.

The external surface 104 of each outermost link plate 96 and the facing internal surface 112 of the corresponding tip member/block 107 are both inclined and are preferably substantially parallel to each other with a slight clearance being provided between the surfaces 104, 112. The surfaces 104, 112 need not be parallel to each other, however.

With the above construction, each tip member/block 107 can rotate around its associated pin 99 or together with the pin 99. Rotation of the tip members/blocks 107 is limited by the surfaces 104, 112 which wedge against each other upon a predetermined rotation of the tip member/block 107 occurring about the axis 113 of the pin 99.

The connectors 90 on the connecting means 88, as shown in FIGS. 9-11, each have leg pairs 114, 116 depending from the tie bar 92. Each leg pair 114, 116 has an entry opening 118 between the free ends 120, 122 of the legs 114, 116 between which the pin 99 is forced during assembly. The legs 114, 116 move away from each other and then spring back to embrace the pin 99 with the pin 99 fully seated. Each leg pair 114, 116 seats in an annular undercut groove 124 formed in the tip member/block 107. The legs 114, 116 are thus keyed to the tip members/blocks 107 so that the axial relationship between the tip members/blocks 107 and pin 99 is fixed, thereby maintaining the tip members/blocks 107 in operative relationship.

Limiting rotation of the tip members/blocks 107, as is accomplished by the cooperating surfaces 104, 112, has several advantages. First of all, the pulley engaging surface 110 is caused to be kept at a proper angle for engagement of the pulley 26. A consistent and positive force transmission results. Further, possible excessive heat generation and wear on the tip members/blocks 107 which may occur when they are freely rotated against the pin 99 and pulley 26 is obviated, to thereby prolong the life of the chain belt 94. Still further, generation of noise due to the rotation of the tip members/blocks 107 occurring when they are placed in contact with and separated from the pulley 26 is effectively suppressed.

Figure 12:
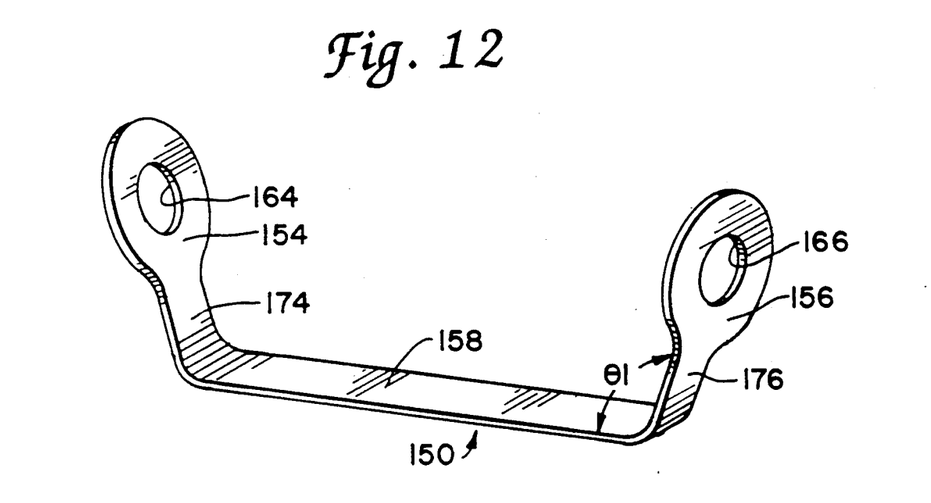
FIG. 12 is a perspective view of a further modified form of tip member/block connecting structure according to the present invention.
Figure 13:
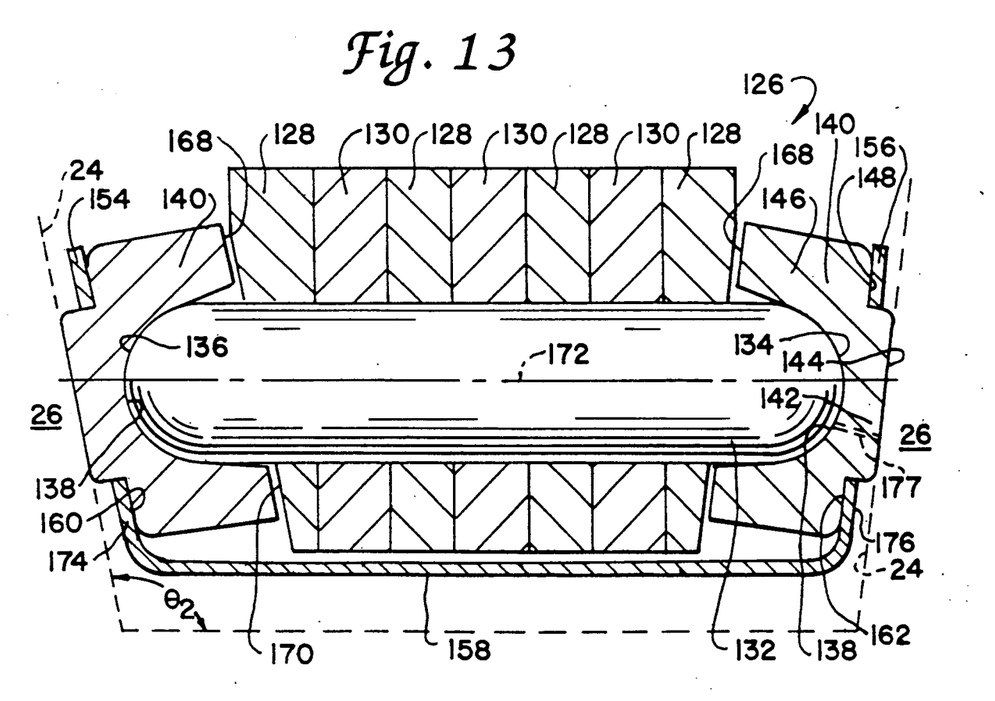
FIG. 13 is a cross-sectional view of a further modified form of chain-type transmission belt according to the present invention with the tip member/block connecting structure in FIG. 12 thereon.
Figure 14:
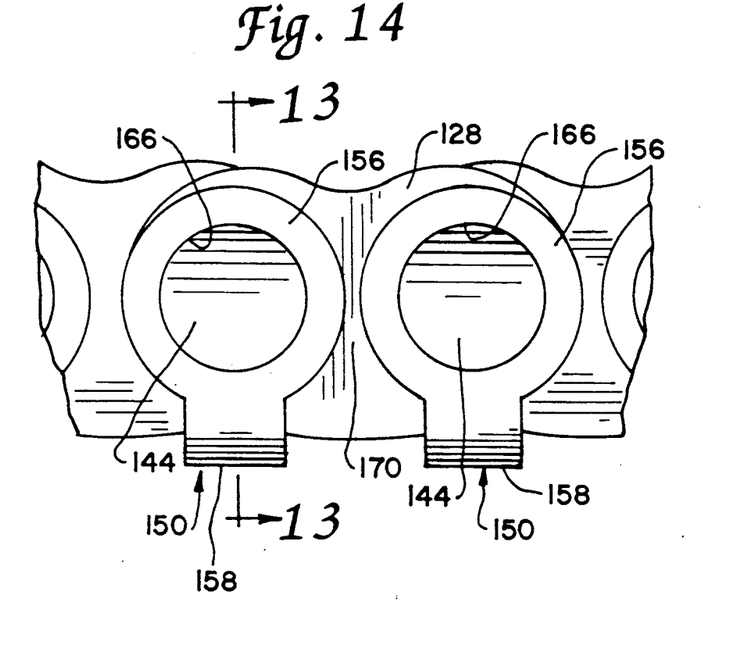
FIG. 14 is a side elevation view of the belt in FIG. 13.

Further embodiments of the present invention are shown in FIGS. 12-15. In FIGS. 12-14, a chain-type power transmission belt is shown at 126 consisting of four primary link plates 128 and three secondary link plates 130, meshed therewith across the width of the belt 126. A pin 132 extends through the link plates 128, 130, to hold the same in operative relationship. The pin 132 has rounded ends 134, 136 projecting through the link plates 128 at the side edges of the belt 126. As in the prior embodiments, the pin ends 134, 136 extend into U-/cup-shaped seats 138 in tip members/blocks 140.

The tip members/blocks 140 each have a cylindrical head 142 with a surface 144 thereon facing laterally outwardly for engagement with the pulley groove surface 24. The tip member/block 140 has a stepped configuration with an enlarged rim 146 having a diameter greater than that of the head 142 and thereby defining a laterally facing, annular shoulder 148.

The connecting means 150 consists of spaced connectors 154, 156 interconnected by a tie bar 158. The connecting means 150 is preferably formed from a blank of sheet metal with the connectors 154, 156 bent out of the plane of the tie bar 158 at an obtuse angle $\theta_1$ approximately equal to the angle $\theta_2$ for the side surfaces of the tip members/blocks 140. This places the planar surfaces 160, 162 facially against the shoulders 148 on the tip members/blocks 140. The connectors 154, 156 have circular cutouts 164, 166, respectively, to accommodate the tip member/block heads 142 which project fully through the connectors 154, 156 to expose the surfaces 144 on the tip members/blocks 140 for engagement with the pulley 26. Because the connectors 154, 156 completely encircle the tip members/blocks 140, the holding force is more positive than with deflectable legs.

The tip members/blocks 140 have laterally inwardly facing surfaces 168, generally parallel to the pulley engaging surfaces 144. The surfaces 168 are spaced from and parallel to a surface 170 on the outermost link plates 128. As in the prior embodiment, rotation of the tip members/blocks 140 and connecting means 150 about the axis 172 or the pin 132 is limited by the wedging action between the surfaces 168, 170.

The connectors 154, 156 are flexible primarily in a plane perpendicular to the plane of the connectors 154, 156. To accommodate this flexing, the open end of the seat 138 on each tip member/block 140 is enlarged to allow the tip member/block 140 to pivot within the described plane without interference with the pin 132. A modicum of twisting movement is permitted by portions 174, 176 on the connectors 154, 156 respectively, which have a relatively narrow width. Because the connectors 154, 156 diverge away from the tie bar 158, the connecting means 150 can be directed into operative position in an inside out direction without significantly deforming the connecting means 150.

To facilitate relative movement between the pin 132 and the tip members/blocks 140, a lubricating channel can be incorporated into the belt 126. More specifically, a bore 177 is made through the tip member/block 140 to direct lubricant between the pin end 134 and the tip member/block seat 138. Pivoting movement of the tip members/blocks 140 relative to the pins 132 is also facilitated by optionally providing a slight space between the pin ends 134, 136 and tip member/block seats 138. The connecting means 150 positively holds the tip members/blocks 140 together in operative relationship and permits this loose arrangement. As mentioned previously, this allows looser tolerances and results in a less expensive belt manufacture.

Figure 15:
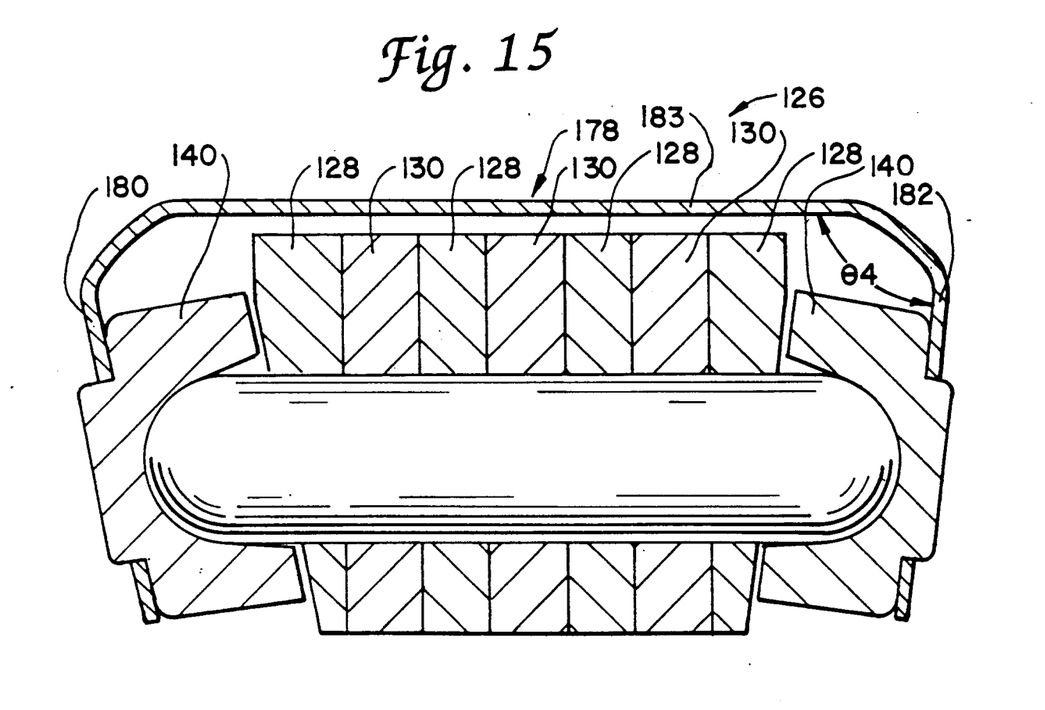
FIG. 15 is a cross-sectional view of a further modified form of chain-type transmission belt according to the present invention.

In FIG. 15, a modified form of the invention shown in FIGS. 12-14 is depicted. The only difference in the structure lies in the connecting means 178. More specifically, the connectors/legs 180, 182 have the same configuration but are bent in towards each other to make an acute angle θ4 with the length of the tie bar 183. This embodiment requires that the legs/connectors 180, 182 be urged away from each other to allow the assembly consisting of the pin 132, link plates 128, 130 and tip members/blocks 140 to be moved operatively therebetween and to be captured thereby in the assembled relationship shown in FIG. 15. In the FIG. 15 embodiment, the tie bar 183 resides on the inside of the belt, whereas in the embodiment in FIGS. 12-14, the tie bar 158 resides outside of the belt.

Figure 16:
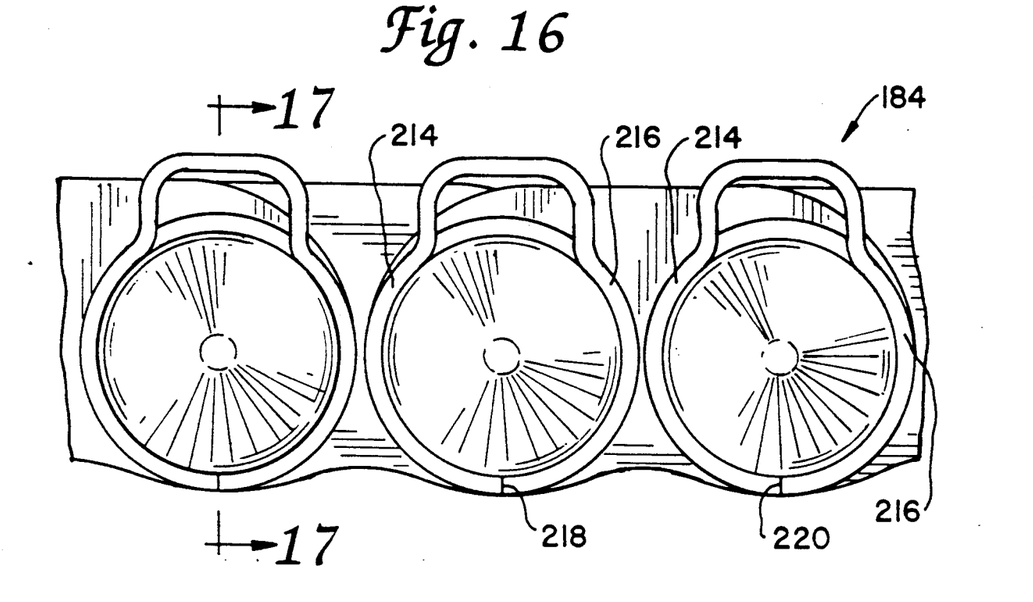
FIG. 16 is a side elevation view of a still further modified form of chain-type transmission belt according to the present invention.
Figure 17:
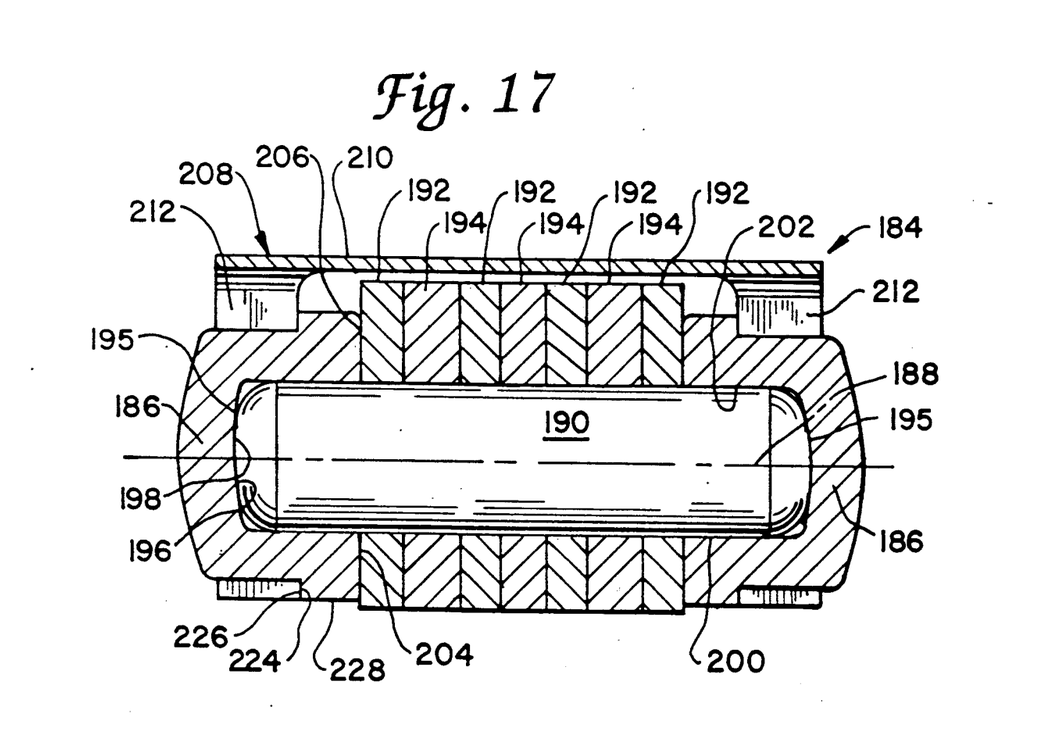
FIG. 17 is a cross-sectional view of the belt taken along line 17—17 of FIG. 16.

A further modified form of belt according to the present invention is shown at 184 in FIGS. 16 and 17. The configuration for the belt 184 is different from other embodiments described above in the fact that the corresponding tip members/blocks 186 are only pivotable about the lengthwise axis 188 of the pin 190 which holds the primary link pins 192 and secondary link pins 194 in operative relationship.

To facilitate uninhibited rotation between the pin 190 and tip members/blocks 186, the ends 195 of the pin 190 are formed with convex outer surfaces. The seat 196 defined in each tip member/block 186 has a concave bottom surface 198 with a radius of curvature greater than that for the surfaces of the pin ends 195. The result is a reduced contact area between the pin 190 and each tip member/block 186. There is, however, substantial contact area between the peripheral outer surface 200 of the pin 190 and the annular wall 202 defining the pin seat 196.

The tip member/block 186 has a planar surface 204 which is perpendicular to the pin axis 188 with the tip members/blocks 186 operatively connected to the pin 190. The surface 204 facially abuts the laterally outwardly facing, planar surface 206 on the laterally outermost primary link pin 192.

A connecting means 208 is provided and has a configuration similar to the connecting means previously described. More specifically, there is a tie bar 210 with connectors 212 at the opposite ends thereof. Each connector 212 consists of curved legs 214, 216 which captively embrace the tip members/blocks 186. The ends 218, 220 of legs 214, 216, respectively, abut, but can be separated to assemble the connectors 212 onto the tip members/blocks 186. The legs 214, 216 cooperatively enclose a circular space with a center axis that is coincident with the axis 188 of the pin 190.

The invention contemplates either a close connection between the tip members/blocks 186 and link plates 192, or a looser fit, which facilitates rotation between the tip members/blocks 186 and pin 190. The connecting means 208 holds the tip members/blocks 186 in operative position even with a loose connection, which minimizes friction between the adjacent, cooperating elements. This minimizes wear on and potential damage to the belt elements. The connecting means 208 holds the tip members/blocks 186 in operative relationship by bearing edges 224, cooperatively defined by the legs 214, 216, against annular shoulders 226 defined on the peripheral, stepped surface 228 of the tip members/blocks 186.

Figure 18:
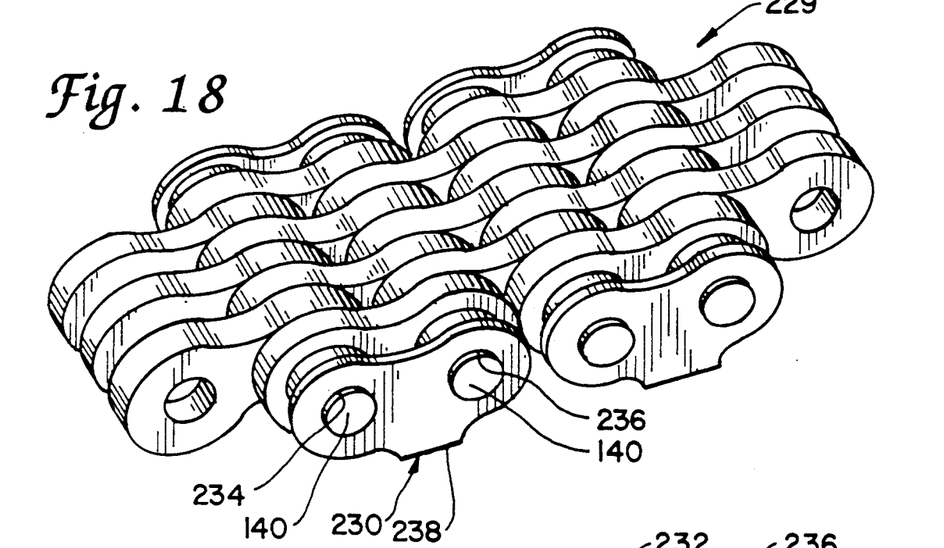
FIG. 18 is a perspective view of a further modified form of chain-type transmission belt according to the present invention.
Figure 19:
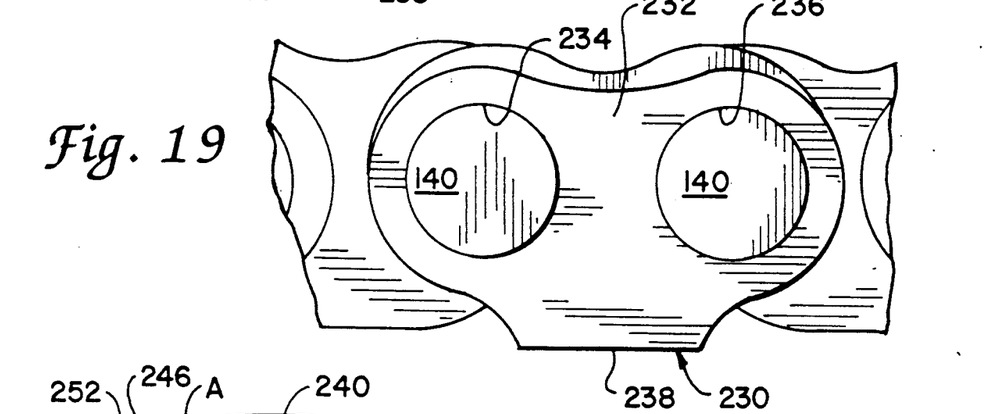
FIG. 19 is a side elevation view of the belt in FIG. 18.

A further belt modification according to the present invention is shown in FIGS. 18 and 19. In FIGS. 18 and 19, a belt 229 is shown having a connecting means at 230 having, at each lateral end thereof, a connector 232 each with spaced, circular openings 234, 236 therethrough to accommodate two adjacent tip members/blocks 140, as shown in FIG. 13. A tie bar 238 joins the laterally spaced connectors 232 to define a unitary structure for the connecting means 230. Whereas, in the prior embodiments, the connecting means are attached to a single pin, the connecting means 230 connects to two pins and operates in substantially the same manner as the earlier described embodiments. The tie bar 238 is wider and therefore more rigid than the earlier described tie bars so that the tie bar 238 does not distort significantly even though the tip members/blocks 140 held thereby may rotate independently of each other.

The various configurations for the connecting means disclosed earlier can be used to join two pins as in the manner of the connecting means 230 in FIGS. 18 and 19. For example, the cross-section taken through line A—A in FIG. 18 would show a structure the same as that in FIG. 13. As in the prior embodiments, the tie bar 238 can be provided either on the outside or the inside of the belt, with the former arrangement being shown in cross-section through line A—A of FIG. 18 in FIG. 15. The structure, in all other respects, operates as the previously described embodiments.

Figure 20:
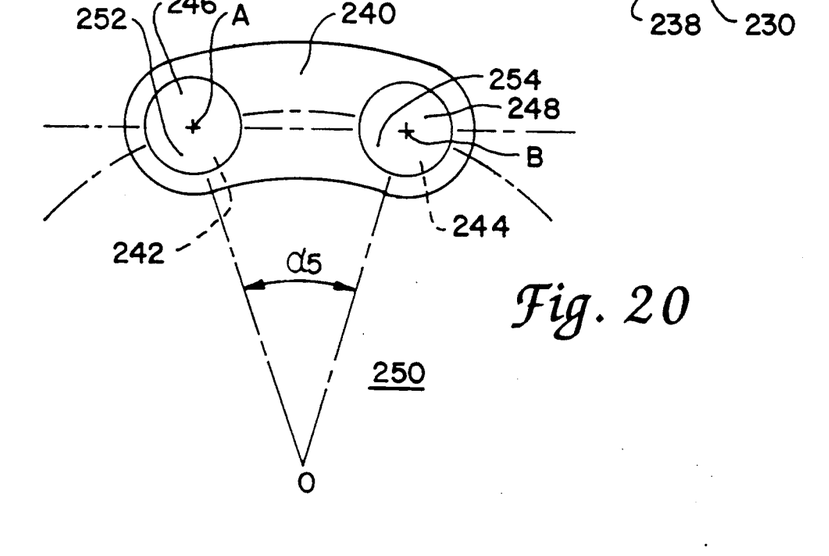
FIG. 20 is a side elevation view of one link plate with associated tip members/blocks in operative relationship to a pulley.

The structure in FIG. 20 is used to demonstrate the problem that is encountered with conventional connectors in chain-type belts with a variable speed pulley. In FIG. 20, a link plate 240 is shown with inclined outer surface parts 242, 244 confronting the tip members/blocks 246, 248, respectively. While the surfaces 242, 244 are coplanar on the link plate 240, the surface of pulley 250 which the surfaces 242, 244 face is not completely parallel thereto. Rather, the inclination angle of the pulley is parallel to the tip member/block surfaces 252, 254 along the separate lines OA and OB, where O is the rotational axis of the pulley 250 and A and B are the centers of the tip members/blocks 246, 248, respectively. The lines OA and OB cooperatively enclose an angle α5.

It is known to provide a pulley with axially movable pulley parts to vary the pulley groove width and therefor the effective diameter of the pulley. As this occurs, the angle, α5, also varies. The result of this is, with conventional type systems, that the incline on the tip members/blocks surface 252, 254 may not reside in parallel relationship with the groove surface. The result may be an insufficient contact area between the tip members/blocks and pulley. With the present invention, this problem is obviated by the rotation and universal pivoting of the tip members/blocks relative to the pulley, so that the necessary contact area between the tip member/blocks and pulley is at all times established.

The foregoing disclosure of specific embodiments is intended to be illustrative of the broad concepts comprehended by the invention.

We claim:

1. A chain-type force transmission belt for engagement with a pulley, said transmission belt comprising:
    a plurality of link plates;
    a plurality of pins connecting said link plates so as to define an endless flexible belt;
    at least one said pin having a lengthwise axis and axially spaced first and second ends;
    a first tip member/block for placement in operative position against the first pin end and having a first surface for engagement with a pulley;
    a second tip member/block for placement in operative position against the second pin end and having a second surface for engagement with a pulley; and
    means in addition to the one pin for connecting between the first and second tip members/blocks and holding the first and second tip members/blocks in their operative position.

2. The chain-type force transmission belt according to claim 1 wherein each said tip member/block has a planar surface that is angularly oriented with respect to the axis of the one pin.

3. The chain-type force transmission belt according to claim 1 wherein each said tip member/block has a planar surface that is angularly oriented with respect to the axis of the one pin at other than a right angle.

4. The chain-type force transmission belt according to claim 1 wherein said connecting means comprises a U-shaped member with a base/tie bar and first and second connectors/legs for engaging the first and second tip members/blocks.

5. The chain-type force transmission belt according to claim 4 wherein at least one said first and second connectors/legs has an opening therein and a part of one of said first and second tip members/blocks extends through said opening, said part of the one of said first and second tip members/blocks defining the surface for engagement with a pulley on the one of said first and second tip members/blocks.

6. The chain-type force transmission belt according to claim 1 wherein the connecting means includes axially facing surfaces between which the first and second tip members/blocks are captured.

7. The chain-type force transmission belt according to claim 1 wherein the one pin end has a curved outer surface and the first tip member/block has a curved seat for reception of the curved outer surface of the one pin end.

8. The chain-type force transmission belt according to claim 7 wherein the curvatures of the outer surface of the one pin end and curved seat are substantially matched.

9. The chain-type force transmission belt according to claim 7 wherein the curved outer surface and curved seat in axial cross section are each defined at least partially by an arc and the arc defining the curved seat has a larger radius than the radius of the curved outer surface of the one pin end.

10. The chain-type force transmission belt according to claim 1 wherein cooperating means are provided on the one pin, the connecting means and the first and second tip members/blocks for holding the first and second tip members/blocks in their operative position movably relative to the one pin.

11. The chain-type force transmission belt according to claim 10 wherein said cooperating means includes first and second deflectable legs on the connecting means for engagement with the first and second tip members/blocks.

12. The chain-type force transmission belt according to claim 1 wherein the connecting means comprises a U-shaped element with a base and first and second spaced connectors/legs, there being an opening through each said leg to accept a part of the first and second tip members/blocks extending therethrough with the tip members/blocks in their operative positions.

13. The chain-type force transmission belt according to claim 12 wherein the parts of the first and second tip members/blocks extending through the openings in the first and second legs define the first and second surfaces for engagement with a pulley.

14. The chain-type force transmission belt according to claim 12 wherein the U-shaped element is formed from a piece of sheet metal so that the legs are bendable axially with respect to the one pin.

15. The chain-type force transmission belt according to claim 1 wherein there are a plurality of links between the first and second tip members/blocks including a first link adjacent to the first tip member/block and a second link adjacent the second tip member/block, the first and second tip members/blocks being spaced from the first and second links respectively.

16. A chain-type force transmission belt for engagement with a pulley, said transmission belt comprising:
    a plurality of link plates;
    a plurality of pins connecting said link plates so as to define an endless flexible belt;
    at least one said pin having a lengthwise axis and axially spaced first and second ends;
    a first tip member/block having a first surface for engagement with a pulley with the first tip member/block in an operative position adjacent to the first pin end;
    a second tip member/block having a second surface for engagement with a pulley with the second tip member/block in an operative position adjacent to the second pin end; and
    means in addition to the one pin for connecting between the first and second tip members/blocks and holding the first and second tip members/blocks in their operative positions.

17. The chain-type force transmission belt according to claim 16 wherein the connecting means comprises a formed piece of wire.

18. The chain-type force transmission belt according to claim 16 wherein the connecting means comprises means for holding the tip members/blocks at the pin ends for universal pivoting of the tip members/block relative to the ends of the one pin.

19. The chain-type force transmission belt according to claim 18 wherein one of said tip members/blocks has a surface adjacent to and facing a surface on one of said link plates and the surfaces on the one tip member/block and one link plate are spaced from each other with the one tip member/block in its operative position.

20. The chain-type force transmission belt according to claim 19 wherein the space between the surfaces on the one tip member/block and one link plate is nonuniform.

21. The chain-type force transmission belt according to claim 19 wherein the surfaces on the one tip member/block and one link plate are curved with the radius of curvatures for the surfaces being different than each other.

22. The chain-type force transmission belt according to claim 16 wherein said connecting means comprises means for connecting the tip members/blocks at the ends of the one pin for movement relative to the one pin.

23. The chain-type force transmission belt according to claim 22 wherein the connecting means permit rotation of the tip members/blocks about the one pin axis relative to the one pin and cooperating means are provided on the tip members/blocks and at least one of the link plates and one pin for limiting rotation of the tip member/block about the one pin axis.

24. The chain-type force transmission belt according to claim 23 wherein the cooperating means on the tip members/blocks and at least one of the link plates and one pin comprises facing, substantially parallel, planar surfaces on the tip members/blocks and the at least one of the link plates and one pin, the planes of said planar surfaces being other than at right angles to the one pin axis so that as each tip member/block rotates about the axis of the one pin, the planar surface thereon interferes with the facing planar surface on the at least one of the link plates and one pin to thereby limit relative rotation between the tip member/block and one pin.

25. The chain-type force transmission belt according to claim 24 wherein the facing planar surfaces are spaced from each other with the planar surfaces in parallel relationship.

26. The chain-type force transmission belt according to claim 22 wherein the tip members/blocks have cup-shaped seats defined therein and the one pin has curved ends fit in the cup-shaped seats.

27. The chain-type force transmission belt according to claim 22 wherein the tip members/blocks each have a cup-shaped seat, the pin ends fit with the seat and means are provided for introducing a lubricant in one of the seats.

28. The chain-type force transmission belt according to claim 27 wherein the means for introducing a lubricant comprises a bore extending through one of the tip members/blocks.

29. The chain-type force transmission belt according to claim 16 wherein the connecting means comprises a U-shaped element with spaced connectors, each said connector engaging a tip member/block.

30. The chain-type force transmission belt according to claim 29 wherein each said connector engages a plurality of tip members/blocks.

31. The chain-type force transmission belt according to claim 29 wherein each said tip member/block has a shoulder and the connectors captively engage the shoulders on the first and second tip members/blocks.

32. The chain-type force transmission belt according to claim 29 wherein at least one of said connectors has spaced legs which captively engage a part of one of the tip members/blocks.

33. The chain-type force transmission belt according to claim 29 wherein at least one of said connectors has spaced legs which are resiliently biased against a part of one of said tip members/blocks to hold the tip member/block in its operative position.

34. The chain-type force transmission belt according to claim 29 wherein a tie bar interconnects said connectors, the belt has an inner side and an outer side, and the tie bar is at the inner side of the belt.

35. The chain-type force transmission belt according to claim 29 wherein a tie bar interconnects said connectors, the belt has an inner side and an outer side and the tie bar is at the outer side of the belt.

* * * * *